United States Patent [19]

Schijven

[11] Patent Number: 4,611,258
[45] Date of Patent: Sep. 9, 1986

[54] CASSETTE RECORDER WITH LOW-ENERGY PAUSE CONTROL

[75] Inventor: Lucas W. M. Schijven, Eindhoven, Netherlands

[73] Assignee: U.S. Philips Corporation, New York, N.Y.

[21] Appl. No.: 721,972

[22] Filed: Apr. 11, 1985

Related U.S. Application Data

[63] Continuation of Ser. No. 399,931, Jul. 19, 1982, Pat. No. 4,561,030.

[30] Foreign Application Priority Data

Aug. 17, 1981 [NL] Netherlands .......................... 8103831

[51] Int. Cl.$^4$ .......................... G11B 5/54; G11B 21/22
[52] U.S. Cl. .................................. 360/105; 360/96.1; 360/96.3
[58] Field of Search .................. 360/93, 96.1–96.6, 360/105; 242/199–201

[56] References Cited

U.S. PATENT DOCUMENTS 4,404,610 9/1983 Koizumi .......................... 360/105 X
4,408,237 10/1983 Takahashi ...................... 360/105 X Primary Examiner—A. J. Heinz
Attorney, Agent, or Firm—David R. Treacy

[57] ABSTRACT

A magnetic tape cassette apparatus having a pressure roller and a magnetic head on a head bracket, movable to a pause position in which the head contacts a tape in the cassette but the pressure roller is disengaged. Insertion of a cassette into a compartment tensions an ejection spring and a pause spring. A play bracket for moving the magnetic head into a playing position is latched by a pause latch in the playing position. The pause latch can be actuated and reset independently without changing tension in the ejection spring, for automatic unlatching and for easy reset to the playing position.

21 Claims, 4 Drawing Figures

CASSETTE RECORDER WITH LOW-ENERGY PAUSE CONTROL

This is a continuation of application Ser. No. 399,931, filed July 19, 1982, now U.S. Pat. No. 4,561,030.

BACKGROUND OF THE INVENTION

The invention relates to a magnetic-tape cassette apparatus comprising a chassis, on which a head bracket carrying a pressure roller and a magnetic head is arranged so as to be movable, a drive plate carrying drive means for a capstan and at least one winding mandrel, and a cassette compartment for receiving a magnetic-tape cassette, (hereinafter referred to as a cassette recorder). Such apparatus are used for recording, or recording and playback, or playback only. In particular, the invention relates to a cassette recorder having an ejection lever pivotally mounted in the cassette compartment. The lever is pivoted upon insertion of the cassette into the cassette compartment. During the pivotal movement in the insertion direction the lever actuates a switching means for moving the head bracket in the direction of the cassette and tensions an ejection spring, which is maintained in the tensioned condition by latching means. An actuating button being is provided for releasing the ejection spring via the latching means and thereby pivoting the ejection lever.

In a known cassette recorder of this type only an ejection spring is tensioned during insertion of the cassette, so that this spring is the only source of stored energy. It is therefore impossible to render the stored energy available in stages. As a result this construction is not suitable for obtaining a pause mode of the apparatus, in which the head bracket is slightly retracted relative to the cassette, to disengage the pressure roller from the capstan. In the known apparatus the ejection spring can only be released completely, so that a comparatively large amount of energy is required to re-start the apparatus.

SUMMARY OF THE INVENTION

An object of the invention is to provide a pause mode in a cassette recorder requiring only a small amount of energy for moving back the head bracket upon termination of the pause.

In accordance with the invention the switching means comprise a movable play bracket and a pause spring connected to the bracket. The spring is tensioned when the ejection lever is pivoted, and the play bracket is latched by a pause latch in the tensioned condition of the pause spring. The pause latch can be actuated independently of the latching means. The play bracket can be coupled to the head bracket for moving the head bracket away from the cassette. This results in a construction which enables a pause mode to be obtained without the necessity of releasing the ejection spring. Since the pause spring needs to move the head bracket over a limited distance only, a comparatively slack pause spring may be employed, so that only a moderate amount of energy is required to reset the apparatus from the pause mode to the play mode. The possibility of using a comparatively slack pause spring further has the advantage that for resetting to the play mode a comparatively small button suffices. Since the play bracket and the pause spring connected thereto are also tensioned during insertion of the cassette no additional operations are needed after insertion of the cassette in the apparatus in accordance with the invention.

A preferred embodiment of an apparatus in accordance with the invention is characterized in that the pause latch is actuated by a solenoid. The solenoid is controlled by an electric switch which also actuates the drive means. In this way it is not only possible to unlatch the pause latch for switching to the pause mode by means of a button of the apparatus but also by other electric means. This may be effected by switching off the power supply of the apparatus, in which case the pause mode and a consequent return movement of the pressure roller away from the capstan are obtained. This is, for example, of advantage if the apparatus in accordance with the invention is used in conjunction with a car radio, the apparatus being always set from the play mode to the pause mode by turning off the car ignition. This prevents the pressure roller from being deformed as a result of prolonged engagement with the capstan. In this way it is also possible to control the solenoid by a tachometer arranged underneath the winding mandrel by electronically de-energizing the solenoid when the tape is stationary. This makes it possible to obtain an automatic change-over to the pause mode upon reaching the end of the tape in the play mode or in the wind mode.

In this respect it is of advantage if the electric switch is actuated by a switching rod which can be coupled to the actuating button for actuating the pause latch. Thus it is possible to switch to the pause mode and to the eject mode of the apparatus by means of the same actuating button.

A reliable and fast operation of the pause latch is obtained if the pause latch is constituted by a bell-crank lever which during tensioning of the pause spring is urged in the direction of the latched position by a spring.

In this respect a preferred embodiment of an apparatus in accordance with the invention is characterized in that the play bracket comprises a lug which does not release the bell-crank lever until the pause spring is tensioned. The lug then is latched behind the cam of the bell-crank lever. This excludes premature latching of the play bracket because the play bracket itself does not release the bell-crank lever until the pause spring is fully tensioned.

A further preferred embodiment of an apparatus in accordance with the invention is characterized in that the switching rod is connected to the play bracket by a coupling spring, which play bracket moves the switching rod via the coupling spring when the pause spring is tensioned. This ensures a correct sequence during latching of the play bracket because the play bracket actuates the solenoid and thus the pause latch via the coupling spring and the switching rod.

In this respect it is also of advantage if the coupling spring is also tensioned when the play bracket is latched, which coupling spring is further tensioned when the actuating button is coupled to the switching rod and, after actuation of the pause latch, causes the play bracket to be moved together with the pause spring. This ensures that the play bracket is not only moved by the pause spring but also by the coupling spring after unlatching. This does not only provide a reliable movement of the play bracket after unlatching, but it also ensures a suitable co-ordination between the movements of the play bracket and the switching rod.

In a further preferred embodiment of an apparatus in accordance with the invention a play button is provided which, via the play bracket, can be coupled to the switching rod for tensioning the pause spring and the coupling spring and for moving and subsequently re-latching the play bracket. In this way switching from the pause mode to the play mode of the apparatus is possible, the switching rod being moved first and subsequently the play bracket in the correct sequence.

In a further preferred embodiment of an apparatus in accordance with the invention the play bracket comprises a lug which is movable, for moving the head bracket against a hook which is pivotally connected to the head bracket, the hook comprising two stops, of which a first stop, against which the lug can be moved, is disposed at a greater distance from the pivotal axis of the hook than a second stop, which is adapted to co-operate with a switching bracket of the switching means upon actuation of the latching means and release of the ejection spring. By arranging the first and the second stop at a greater and smaller distance, respectively, from the pivotal axis of the hook it is ensured that the play bracket retracts the head bracket over a limited distance only, which distance is such that suitably the pressure roller and the magnetic head are just in contact with the magnetic tape in the cassette, whilst upon release of the ejection spring a larger displacement of the head bracket is obtained by means of the switching bracket and the second stop, which displacement suffices to move the magnetic head and the pressure roller out of the cassette, so that the cassette can be ejected from the cassette compartment without being impeded.

A further preferred embodiment of an apparatus in accordance with the invention is characterized in that the actuating button can be moved from the rest position to a pause position by a displacement in a first direction, in which pause position the pause latch is actuated and is movable to an eject position by a further displacement in the first direction, in which position the actuating button can be coupled to a main latch of the latching means, which main latch unlatches the switching bracket, which bracket subsequently moves the head bracket away from the cassette via the second stop on the hook. Thus, the pause position is always passed during the movement to the eject position. Since for moving the actuating button to the pause position only a small force is required in advertently passing to the eject position is substantially excluded.

An embodiment of the invention will be described in more detail, by way of example, with reference to the drawing.

DESCRIPTION OF THE PREFERRED EMBODIMENT

Figure 1:
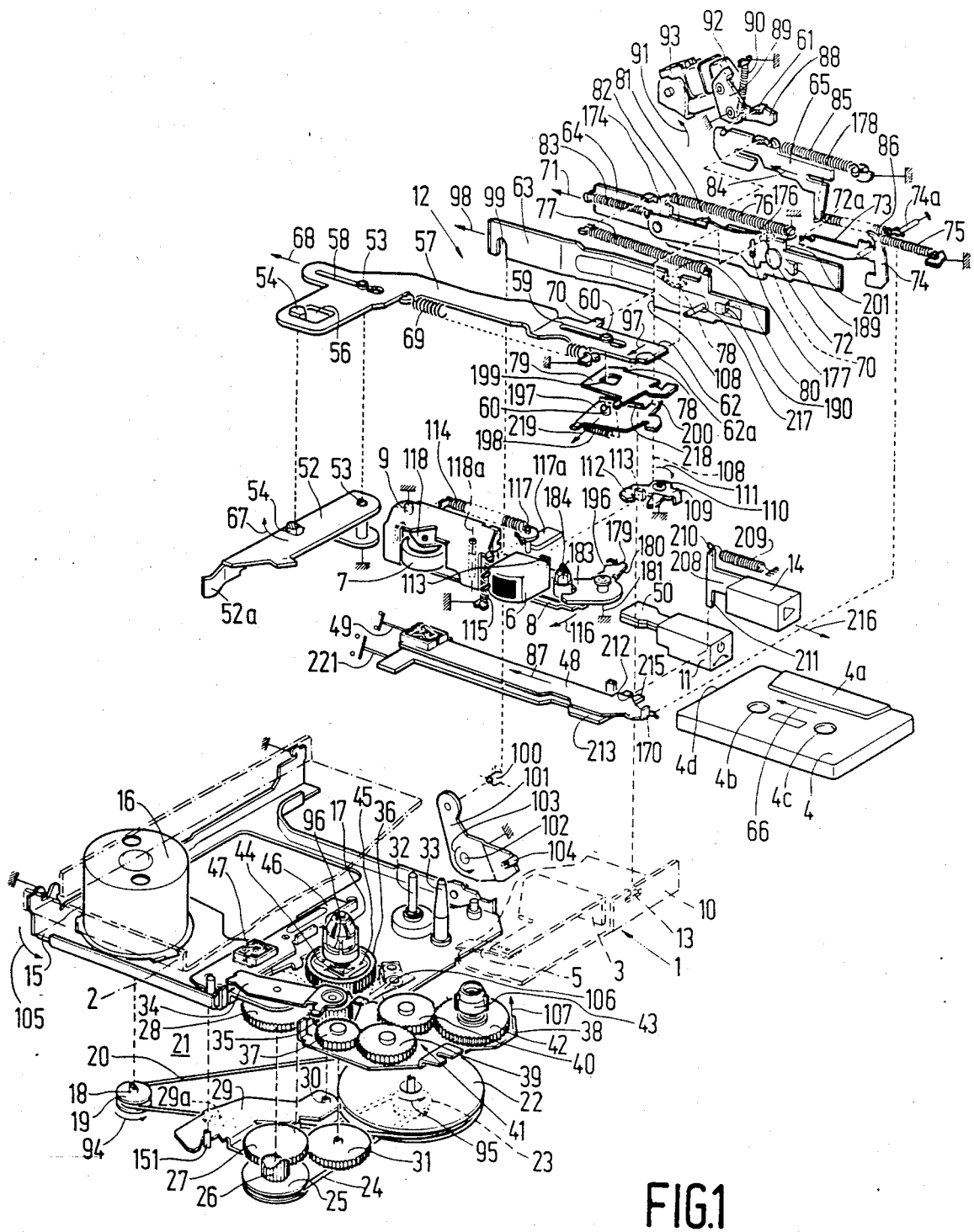
FIG. 1 is a diagrammatic exploded view of parts of a cassette recorder having the invention, with the apparatus in the play mode of operation.

The cassette recorder shown in FIG. 1 has a chassis 1 suitably constructed so that the apparatus can be accommodated in a space of limited dimension. An example of this is a combined use conjunction with a car radio. Other uses, such as incorporation in a portable radio, are equally possible. For bounding a cassette compartment the chassis 1 comprises an upright guide edge 2 and an L-shaped support 3, which edge and support also serve for guiding a magnetic-tape cassette 4, of the so-called compact-cassette type described in the U.S. Pat. No. 3,394,899. The guide edge 2 and the support 3 are so arranged relative to each other that during insertion the cassette is guided in the longitudinal direction, a leaf spring 5 on the support 5 ensuring that the cassette is pressed against the chassis 1. The support 3 has such a height relative to the chassis 1 that it allows the passage of the raised portion 4a of the cassette 4, the leaf spring 5 acting on the adjacent major surface of the cassette 4. The raised portion 4a has a number of apertures through which a magnetic head 6 and a pressure roller 7 can pass for co-operation with a magnetic tape contained in the cassette 4 during operation. The magnetic head 6 and the pressure roller 7 are arranged on a head bracket 8, which is pivotable about a spindle 9 on the chassis 1.

Adjacent the support 3 the chassis comprises an upright support 10 which carries an actuating button 11. The support 10 has a number of guide slots, which guide a number of brackets of a switching mechanism or means 12 of the apparatus. Only one guide slot 13 is shown, for guiding an ejection bracket 57 whose operation will be described in more detail hereinafter. The support 10 also carries a play or a start button 14, whose operation will also be described hereinafter.

Drive Mechanism

At the side of the chassis 1 which is remote from the support 3 a drive plate 15 is pivotally mounted underneath the chassis 1. The plate 15 is secured to the chassis 1 in such a way that a pivotal movement is obtained about an axis perpendicular to the longitudinal direction of the cassette 4. On the drive plate 15 an electric motor 16 and a take-up mandrel 17 are mounted. On the motor shaft 18 a pulley 19 is mounted, for driving a drive means 21 through a belt 20. The drive means comprise a flywheel 22 having a circumferential groove for receiving the belt 20. The flywheel is rotatably journalled on the drive plate 15 and is rigidly connected to a pulley 23 at the underside. A belt 24 is passed around the pulley 23 and a further pulley 25, which is rigidly connected to a comparatively small gear-wheel 26 and a large gear-wheel 27. The teeth of the small gear-wheel 26 are in mesh with the teeth of an idler wheel 28 which is rotatably mounted on an arm 29, which arm is pivotally connected to the drive plate 15 by a spindle 30. A tension spring 29a connected between the arm 29 and the plate holds the arm 29 in a position where the teeth of the idler wheel 28 are also in mesh with a gear wheel 31 arranged coaxially underneath the take-up mandrel 17. The gear 31 is coupled to the mandrel by a slipping clutch, not shown. A capstan 32 rigidly connected to the flywheel is arranged on the upper side of the drive plate 15. Openings in the chassis 1 allow the capstan 32 and a cassette locating pin 33, also carried on the drive plate 15, to pass through into the cassette when the drive plate is pivoted upward.

A spindle mounted on the drive plate 15 coaxially with the gear wheels 27 and 26, carries a pivotable swing arm 34. At a free end the arm 34 arm carries an idler wheel 35, which in the play mode shown in FIG.

1 is only in mesh with the teeth of the large gear-wheel 27. In a manner to be described hereinafter the idler wheel 35 can be coupled, through a pivotal movement of the arm 34, to a gear-wheel 36 which is rigidly connected coaxially to the winding mandrel, or to a gear-wheel 37 which is rotatably journalled on an auxiliary frame 38. In addition to the gear-wheel 37 two gear-wheels 39 and 40 are rotatably mounted on the auxiliary frame 38. These gears together with the gear wheel 37 constitute a transmission means 41 for driving a gear-wheel 42 which is rigidly connected coaxially to a supply mandrel 43. In the chassis 1 two additional openings are formed for the winding mandrels 17 and 43, so that if the drive plate 15 is pivoted upward the winding mandrels can engage the hubs 4b and 4c of the cassette 4.

The auxiliary frame 38 can be translated to and fro relative to the chassis 1 in a manner not shown, such that the auxiliary frame 38 is moved towards the chassis almost simultaneously with the pivotal movement of the drive plate 15. Thus, the winding mandrels 17 and 43 are situated underneath the chassis 1 during insertion of the cassette 4 and, in a manner to be described hereinafter, are passed through the openings in the chassis to engage with the hubs 4b and 4c respectively upon completed insertion of the cassette.

On the upper side of the gear wheel 36, brushes or sliding contacts 44 are arranged, which constitute the rotary parts of a tachometer 45 situated underneath the winding mandrel 17. When the drive plate 15 is swung up the brushes contacts 44 contact a stator, not shown, of the tachometer 45, which is accommodated on a printed circuit board on the underside of the chassis 1. A switching rod 46 is arranged on the upper side of the drive plate 15 so as to be rectilinearly movable. This rod 46 can actuate an electric switch 47, whose contacts are located on a p.c. board, not shown, which is secured to the chassis. Another switching rod 48 at the underside of the chassis 1, is arranged for actuating an electric switch 49.

Control Mechanisms

The actuating button 11 is rigidly connected to a lug 50, which relative to the chassis 1 can be pivoted in a horizontal plane and which is guided to be slidable in a direction perpendicular to the support 10. The lug 50 is coupled to a switching mechanism 51 (see FIG. 2), to be described in more detail hereinafter.

In the cassette compartment an ejection lever 52 is arranged on the upper side of the chassis 1 so as to be pivotable about a spindle 53. When the cassette 4 is inserted in its longitudinal direction the ejection lever is pivoted in a manner to be described hereinafter. A finger 54 on the upper side of the lever 52 engages a rectangular opening 56 in an ejection bracket 57. The bracket 57 forms part of the switching mechanism 12 and is rectilinearly movable parallel to the longitudinal direction of the magnetic-tape cassette 4, one end of the bracket 57 being guided in the slot 13 of the support 10. To control this movement an elongate slot 58 is formed in the ejection bracket 57, and a further slot 59 is formed in the bracket 57 through which a spindle or pin 60 is passed. The spindle 60 is rigidly connected to a pivotal bracket 197, to be described in more detail.

The opening 56 is shown rectangular for assembly purposes. In principle, the guide opening for the finger 54 may, for example, be triangular. However, it is essential that the finger 54 has sufficient clearance in the bottom-left corner of the opening to allow a free pivotal movement of the ejection lever 52. Viewed in the transverse direction of the bracket 57, an end portion 62 is slightly narrowed, so that, in a manner to be described hereinafter, an edge 62a of the bracket 57 can engage behind the support 10 in the play mode of the apparatus.

The switching mechanism 12 also includes a control bracket 63, which controls the pivotal movement of the drive plate 15; a switching bracket 64, which controls the head mounting bracket 8; and a play bracket 65, which actuates the switching rod 48 and thus the switch 49, and also controls the head-mounting bracket 8.

For clarity of the drawing only those parts are shown which are relevant to the specific mode of operation of the apparatus. Parts which are not relevant to that mode are not shown in the figure in question. The various parts of the apparatus will be described in more detail with respect to the various modes of operation of the apparatus.

A. Play mode

When the cassette 4 is inserted in the longitudinal direction in accordance with the arrow 66 the side wall 4d of the cassette butts against the free end 52a of the ejection lever 52. As a result of the pivotal movement about the spindle 53, viewed in FIG. 1, the ejection lever finger 54 moves in an insertion direction shown by arrow 67 from the top-left corner of the opening 56 along the edge of the opening to the bottom-left corner of the ejection bracket opening and then drives the bracket 57 in the longitudinal direction shown by arrow 68, so that the slot 58 is moved relative to the spindle 53 in the direction of the arrow 68 into the position shown in FIG. 1. At the same time an ejection spring 69 in the form of a tension spring arranged between the bracket 57 and the chassis 1 is tensioned. A lug 70 on the ejection bracket 57 moves the switching bracket 64 during the movement in the direction of the arrow 68. The bracket 64 is also rectilinearly movable, in the direction of an arrow 71 parallel to the arrow 68. The bracket 64 carries a cam 72 with a spindle 72a which is guided along a hook 74 having a downwardly sloping edge 73 during a movement in the direction of the arrow 71. When the spindle 72a reaches the end of the edge 73, where the edge slopes downward, a tension spring 75 between the hook and the chassis 1 pivots the hook 74 slightly about the spindle 74a in a vertical plane, the travel being approximately 1 mm in the present embodiment. This movement suffices to latch the hook behind a part of the chassis, so that the hook occupies a fixed position. As a result of this pivoting movement, the cam 72 is positioned behind the downward slope of the hook 74, thereby latching the bracket 64 in its extreme position after the movement in accordance with the arrow 71. Thus, the hook 74 functions as a main latch of the latching means of the apparatus. A tension spring 76, which is arranged between the bracket 64 and the chassis, is tensioned during the bracket movement in the direction of the arrow 71, but because of the latching function, the spring is not capable of returning the bracket 64. Simultaneously with the movement of the bracket 64 a switching spring 77 arranged between the bracket 64 and the control bracket 63 is tensioned. The bracket 63, however, cannot yet be moved, because a lug 78 on a latching bracket 79 engages a slot 80 in the control bracket to prevent movement of the bracket 63.

The play bracket 65 has a lug 81, which during the movement of the switching bracket 64 in the direction of the arrow 71 is positioned behind a hook which is formed in an auxiliary bracket 82 which is pivotably connected to the switching bracket 64. The lug 70 is positioned against another hook-shaped portion on the auxiliary bracket 82, so that indirectly the auxiliary bracket 82 forms a coupling between the ejection bracket 57 and the play bracket 65. A tension spring 83 tends to pivot the auxiliary bracket 82 upwards, to ensure that at the beginning of each movement in the direction of the arrow 71 the auxiliary bracket 82 occupies the upper pivoted position. Because of this engagement of the lug 81 by the bracket 82 the play bracket 65 is moved in the direction of the arrow 84, parallel to the arrow 71. A pause spring 85 formed by a tension spring arranged between the bracket 65 and the chassis is tensioned by this movement. Moreover, a coupling spring 86 is tensioned, which spring is arranged between the bracket 65 and one end of the switching rod 48. As a result of this, the switching rod 48 is also moved in the direction of the arrow 87, so that the switch 49 is closed.

As the play bracket 65 is moved a lug 61 on the bracket 65 slides over a cam 88 arranged on a bell-crank lever 89 which is pivotally connected to the chassis, a tension spring 90 tending to pivot the bell-crank lever 89 in the direction of arrow 91. This pivotal movement is possible as soon as the lug 61 has passed the cam 88. This pivotal movement in the direction of the arrow 91 allows an iron member 92 arranged on the bell-crank lever 89 to move against the core of a solenoid 93, which solenoid will be referred to herein as the play solenoid. Simultaneously, the switch 49 is closed by the movement of the switching rod 48, so that the play solenoid 93 is energized and thereby keeps the bell-crank lever 89 in the pivoted position. The play bracket 65 is then latched in the position of maximum displacement (play position) in the direction of the arrow 84, because of the engagement of the lug 61 behind the cam 88. The spring 85 remains tensioned owing to the action of the solenoid 93. Thus the bell-crank lever 89 functions as a latch.

When the switch 49 is closed by the movement of the switching rod 48 the motor 16 is also energized. The pulley 19 begins to rotate in a direction indicated by the arrow 94 and the flywheel also begins to rotate in the direction of the arrow 95. The capstan 32, which is connected to the flywheel, and the pulley 23 then also begin to rotate. Via the belt 24, the pulley 25, the small gear-wheel 26, the idler wheel 28, and the gear-wheel 31 the take-up mandrel 17 is set into rotation in a direction indicated by the arrow 96. It is to be noted that this switching sequence, which occurs prior to a further actuation of the switching mechanism 12 and, in particular, a pivotal movement of the drive plate 15 to the active position, serves to prevent tape spillage in the magnetic-tape cassette.

Since the ejection bracket 57 has been moved in the direction of the arrow 68 the spring 77, assisted by the spring 76, exerts a force on the bracket 57 through the lug 70. Because the spring 69 exerts a force on the bracket near the other end, the bracket 57 is subjected to a clockwise moment. Since the finger 54 has reached the bottom-left corner of the opening, the bracket 57 can now pivot about the finger 54. Consequently, the end portion 62 is moved in the direction of the arrow 97. As a result, the lug 70 is no longer retained behind auxiliary bracket 82. As the spindle 60 is situated in the slot 59, the spindle is pushed against the edge of that slot and is moved in the direction of the arrow 219 together with the pivotal bracket 197. By moving the pin 60 in the direction of the arrow 219, the spindle pushes against the latching bracket 79 and the lug 78 of the latching bracket 79 is withdrawn from the slot 80 in the control bracket 63. Since, as already described, the tension spring 77 has been tensioned during the preceding movement of the switching mechanism the control bracket 63 now springs in the direction of the arrow 98, which direction is parallel to the direction indicated by the arrow 71.

On the side wall of the bracket 63 a latching pin 217 is arranged, which subsequently, at the end of the movement of the bracket 63 and the pivotal bracket 197 to an active position, pushes against an edge 218 of the pivotal bracket 197 and prevents the pivotal bracket from moving back. As a result of the movement of the end portion 62 in accordance with the arrow 97 the edge 62a plunges sideways out of the guide slot 13 in the support 10. The bracket 57 is then latched behind the support 10, against the tension of the ejection spring 69. The pin 217, indirectly via the bracket 197, prevents the bracket 57 from moving back, so that the pin 217 with the support 10 forms part of the latching means for the bracket 57. In this position of the bracket 57, the ejection lever 52 can pivot freely over some distance, which distance is determined by the edge of the opening 56, which edge acts as a stop, and by a cassette wall 4d. Thus, in the actuated position of the bracket 57 the ejection lever 52 exerts no force on the cassette 4, so that impact forces which may occur during switching of the switching means 12 cannot be transmitted to the cassette 4 via the lever 52.

In this respect it is also essential that the leaf springs can exert sufficient pressure on the cassette 4 without being impeded by the spring 69 in order to ensure a correct positioning on the chassis 1. A further advantage at higher ambient temperatures is that no pressure occurs which may give rise to mechanical deformation of the cassette.

The bracket 63 has an opening 99 in which a pin 100 is disposed. This pin forms part of a swing bracket 101, which is pivotably connected to the chassis 1. Due to the displacement of the opening 99 the pin 100 with the swing bracket 101 performs a pivotal movement about the pivotal axis 102 of the swing bracket in the direction of the arrow 103. Consequently, a pin 104, connected to the drive plate 15, will move in the counterclockwise direction. The drive plate 15 is then ultimately swung up into the operating position in a direction indicated by the arrow 105 as a result of the release of the spring 77. Simultaneously, the winding mandrel 17 engages the hub 4b and the capstan 32 and the locating pin 33 are moved into the relevant openings in the raised portion 4a of the cassette 4. On the drive plate 15 a leaf spring 106 is arranged, which during the pivotal movement of the drive plate 15 in the direction of the arrow 105 is moved against the auxiliary frame 38 and which, as the drive plate 15 is pivoted further, assists in pushing up the auxiliary frame 38 with the transmission means 41 and the supply mandrel 43 arranged on this frame. This movement, indicated by the arrow 107, causes the supply mandrel 43 to engage the associated hub 4c of the cassette 4. The principal advantage of the auxiliary frame 38 which, in accordance with a characteristic feature of the invention, is arranged on the chassis to be movable perpendicularly thereto and which is coupled to the pivotal drive plate 15 by the leaf spring 106, is that it provides a sufficient displacement of the supply mandrel 43 and it ensures that enough space remains available at the front of the apparatus, for example, in the case of a car radio to accommodate a keyboard on the front panel of the car radio.

As a result of the movement of the bracket 63 in the direction of the arrow 98 an edge 108 of the bracket 63 pushes against a rotary plate 109 which is arranged on the chassis 1 to be pivotable about a pivotal axis 110. As a result of this the rotary plate 109 is moved about the axis 110 in accordance with an arrow 111. The rotary plate 109 comprises a hook 112, which initially retains a lug 113 which forms part of the head bracket 8. The pivotal movement in the direction of the arrow 111 releases the lug 113 from the hook 112. An over-center spring 166 (FIG. 2) now ensures that the head mounting bracket 8 is pivoted towards the cassette 4 about the axis 9 in the direction of the arrow 116. A spring 115 is attached to the head bracket 8 and to the chassis 1, and a spring 114 is attached to the head bracket 8 and to a pin 117 on a pressure-roller lever 118. The pin 117 is guided along an edge 117a of the chassis 1, and, together with the pressure-roller lever 118, it is connected to the head bracket 8 so as to be pivotable about an axis 118a. During the pivotal movement of the head bracket 8 in the direction of the arrow 116 under the influence of the spring 115, the spring 114 pulls the pin 117 against the edge 117a. As this edge is disposed substantially tangentially relative to the spindle 9, the pressure roller 7 remains in a slightly retracted position relative to the head bracket 8. The spring 114 cannot relax and pivot the pressure-roller lever 118 about the axis 118a relative to the head bracket until the pin 117 has reached the end of the edge 117a, so that the pressure-roller lever 118 is not pivoted until the last stage of the pivotal movement of the head bracket 8 is released. In this way the magnetic head 6 is first moved towards the magnetic tape in the cassette 4 and subsequently the pressure roller 7 is rapidly positioned against the capstan 32. The main advantage of this movement in stages, in accordance with a further characteristic feature of the invention, is that the spindle 9 may be arranged comparatively close to the pressure roller 7, so that the head bracket 8 occupies a minimal space in the apparatus, while the spring 114 provides sufficient pressure of the pressure roller on the capstan 32. Since the winding mandrels 17 and 43 have already penetrated the cassette, the mandrel 17 and the capstan 32 are already rotating, and the pressure roller is now positioned against the capstan, the play mode of the apparatus is obtained and the signals on the tape can now be reproduced.

B. Pause-search mode.

In this mode the recorder can detect a pause of sufficient length between two passages on the tape which are modulated with signals, upon which the apparatus switches from a fast-winding mode to the play mode, starting with the next modulated passage on the tape. During searching the motor 16 rotates with the same speed as during fast winding, but tape transport is effected, for example, with a speed which is maximum 10% lower because of the friction, among other things, between the magnetic head and the magnetic tape. Searching is possible in two winding directions of the magnetic tape and therefore the button 11 can be pivoted in two opposite directions in a horizontal plane.

Figure 2:
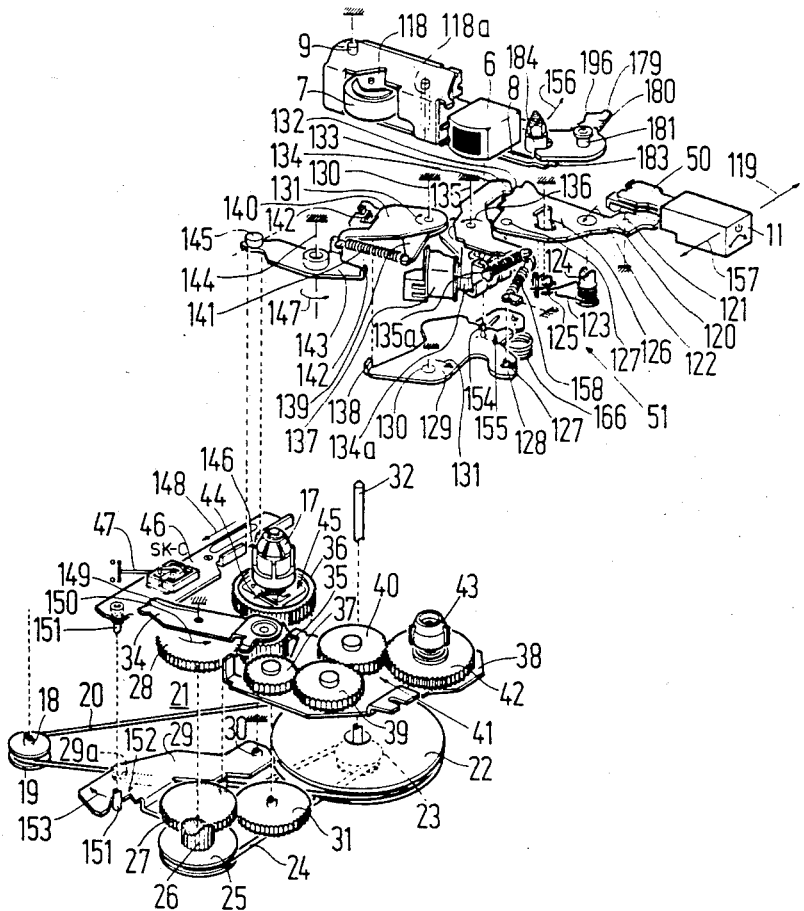
FIG. 2 is a perspective view of the parts of the apparatus of FIG. 1 in the pause-search mode.

FIG. 2 represents the situation in which the button 11 is moved to the right, indicated by an arrow 119. From this pivotal movement a number of movements of the switching mechanism behind the button 11 are derived. For example, as a result of the button movement a plate 120 is pivoted in the direction of the arrow 122 about a spindle 121 mounted on the chassis 1. The pivotal movement of the plate 120 opposes the force of one of the limbs of a spring 123, which is arranged around a pin 124 on the plate 120 and which, depending on the movement of the plate, bears against a pin 125 connected to the chassis 1 with the other limb, which pin extends through a slot 126 in the plate 120. Thus, the spring 123 always tends to pivot the button 11 into the neutral center position.

The plate 120 also carries a pin 127 which is disposed in an opening 128 in a pivotal bracket 129. The bracket 129 is pivotable about a spindle 130, connected to the chassis 1 and, because of the pivotal movement of the plate 120, it is pivoted in the direction of the arrow 131. The plate 120 comprises a number of cams 132, which may engage a hook 133 of a pivotal plate 134. The movement of the plate 120 in the direction of the arrow 122 and the arrangement of the plate 134 to be pivotable relative to the chassis about a pivotal axis 135 cause a pivotal movement of the plate 134 about the axis 135 in the direction of the arrow 136. A finger 138 or the pivotal bracket 129 acts against a bracket 140 which is also pivotable relative to the chassis about the spindle 130. The bracket 140 consequently pivots in the direction of the arrow 131 about the spindle 130. The bracket 140 has a recess, in which a cam 142 of a bell-crank lever 143 engages, which lever is pivotable relative to the chassis about a pivotal axis 144. Moreover, a plate 139 is also arranged on the spindle 130, and is pivoted by a spring 141 during the pivotal movement of the bracket 140, the plate 139 thus being urged against the cam 142. The bell-crank lever 143 has a cam 145 which serves to guide the lever 143 at its end which is remote from the spindle 144 in a plane which is perpendicular to said spindle. The edges of the lever 143 near the cam 145 engage a recess 146 in the switching rod 46. The movement of the bracket 140 and the plate 139 in the direction of the arrow 131 causes the lever 143 to pivot in a direction 147 above its spindle 144. As a result, the switching rod 46 is moved in the direction of the arrow 148, so that the switch 47 is actuated and a solenoid 137 is energized.

Figure 3:
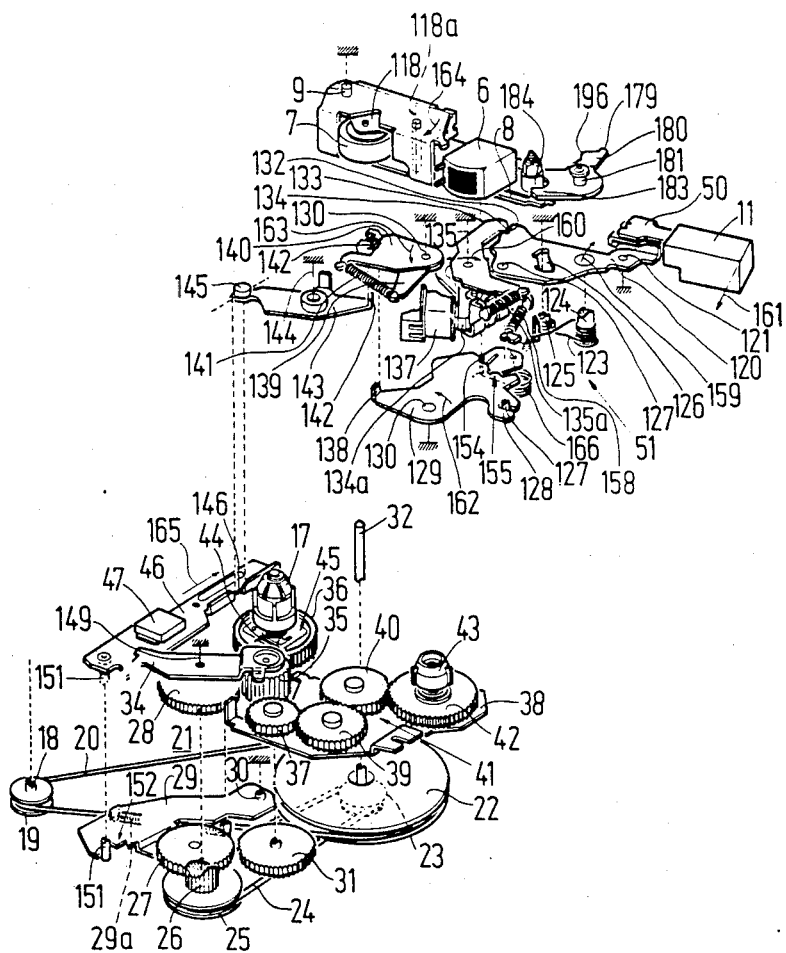
FIG. 3 is a perspective view of the parts of the apparatus of FIG. 1 in the fast-wind mode.

When the lever 143 has reached an end-position, the button 11 moves the bracket 140 slightly further, so that the plate 139 presses against the cam 142 and further tensions the spring 141. The further movement of the button 11 is necessary to ensure that the plate 134 passes the cam 132 and can swing back. Swinging-back is effected in that an armature bracket 134a is pivoted about the spindle 135 in the direction of an arrow 160 by a tension spring 158. (FIG. 3). A tension spring 135a arranged between the plate 134 and the armature bracket 134a ensures that the plate 134 is also pivoted back. As in the meantime the solenoid 137 has been energized, the plate 134 is thus latched, so that the button 11 is latched in the pivoted position. However, the tension spring 135a enables the button 11 to be moved back manually. Also, as a result of this change-over of the switch 47 the motor 16 receives a higher voltage and consequently begins to run faster to provide the desired faster tape transport. This means that the switch 47 is the play/wind switch of the motor 16.

The swing arm 34 is coupled to the switching rod 46, and is pivotable relative to the drive plate 15 about a pivotal axis 149. Thus, the movement of the switching rod 46 in the direction of the arrow 148 results in the swing arm 34 being pivoted in the direction of the arrow 150. Further, a pin 151 is connected to the switching rod 46, which pin is movable along cams 152 arranged on the arm 29. A movement of the pin 151 along the cams 152 in the direction of the arrow 148 results in the arm 29 being pivoted about the spindle axis 30 in accordance with the arrow 153 against the action of the spring 29a. As a result of this, the gear-wheel 27 is disengaged. The faster motor speed is now imparted to the gear-wheel 36 via the gear-wheel 35, so that the take-up mandrel 17 will wind the tape at a higher speed.

On the underside of the head bracket 8 a pin 154 is arranged, which can run along an edge 155 of the pivotal bracket 129 having a stepped profile. In the play mode the pin 154 is located on that part of the edge 155 which is situated at a short distance from the spindle 130. Because of the movement of the bracket 129 in the direction of the arrow 131 the pin 154 is moved over a first part of the edge, so that the head bracket 8 with the magnetic head 6 moves approximately 1.6 mm backwards relative to the cassette 4 in a direction indicated by the arrow 156, the head remaining in contact with the magnetic tape or at such a small distance from the tape that a satisfactory signal is produced. The solenoid 137 latches the mechanism during winding, so that the actuating button 11 may be released. This is necessary because otherwise the mechanism would pivot back under the influence of the spring 123. This is the case both during the pause-search mode and during normal fast winding.

When the button 11 is pivoted in a direction opposite to the arrow 119, as indicated by the arrow 157, the gear-wheel 35 will mesh with the gear wheel 37. It is evident that the supply mandrel 43 is then driven instead of the take-up mandrel 17. The tape is then wound in the opposite direction. Upon detection of a pause an electric circuit, not shown, in the apparatus is actuated, which circuit de-energizes the solenoid 137. As a result of this the armature bracket 134a no longer keeps the pivotal plate 134 latched, so that as shown in FIG. 3 the plate 120 is moved back in the direction of an arrow 159 under the influence of the switching spring 123. This results in the plate 134 sliding over the cam 132 and subsequently being moved in the direction of the arrow 160. This gives rise to a movement of the button 11 in the direction of the arrow 161, so that the button 11 is urged back into the center position. This is a sign for the user of the magnetic-tape cassette apparatus that a pause is found. This may also be of advantage if no further modulation is contained on the tape, because in that case the button 11 also springs back.

Upon the movement of the plate 120 in the direction of the arrow 159 the pivotal bracket 129 is also pivoted in the direction of the arrow 162 via the pin 127. This ensures that the bracket 140 also moves back in the direction of the arrow 163 and that via the pin 154 the head bracket 8 with the magnetic head moves back in the direction of the arrow 164. Thus, the magnetic head returns to the play position in the cassette. Via the bellcrank lever 143 the switching rod 46 is subsequently moved back in the direction of the arrow 165, so that the switch 47 is changed over and the motor voltage is reduced again, thereby reducing the speed of the motor 16 and the idler wheel 35 being disengaged from the gear wheel 36 as a result of the movement of the swing arm 34. As during the movement of the switching rod 46 under the influence of the spring 29a the arm 29 again assumes the original position the idler wheel 28 again establishes a connection between the small gear-wheel 26 and the gear-wheel 31.

The movement of the head bracket 8 in the direction of the arrow 164 is possible because the pin 154 is urged in the direction of the arrow 164 by means of the comparatively strong over-center spring 166. During the last stage of the return movement of the head bracket the faster movement of the pressure roller lever 118 is obtained, as already described. It is to be noted that the present method of switching the apparatus, upon detection of a pause, can also be obtained if during fast rewinding of the tape towards the supply mandrel 43 the tachometer 45 detects the stationary condition of the gear-wheel 36 and thus the leading tape end. The solenoid 137 is then also de-energized, the motor speed is reduced, the drive means 21 are switched to the play mode, and the reproduction of the signals on the magnetic tape is repeated automatically (so-called "auto-replay").

If during fast winding of the tape to the take-up mandrel 17 the tachometer 45 detects the stationary condition of the gear wheel and thus the end of the tape, the solenoid 137 is de-energized, but in addition the switching rod 48 is unlatched, so that via the switch 49 the solenoid 93 is also de-energized and the apparatus is switched to the pause mode (see D).

Figure 4:
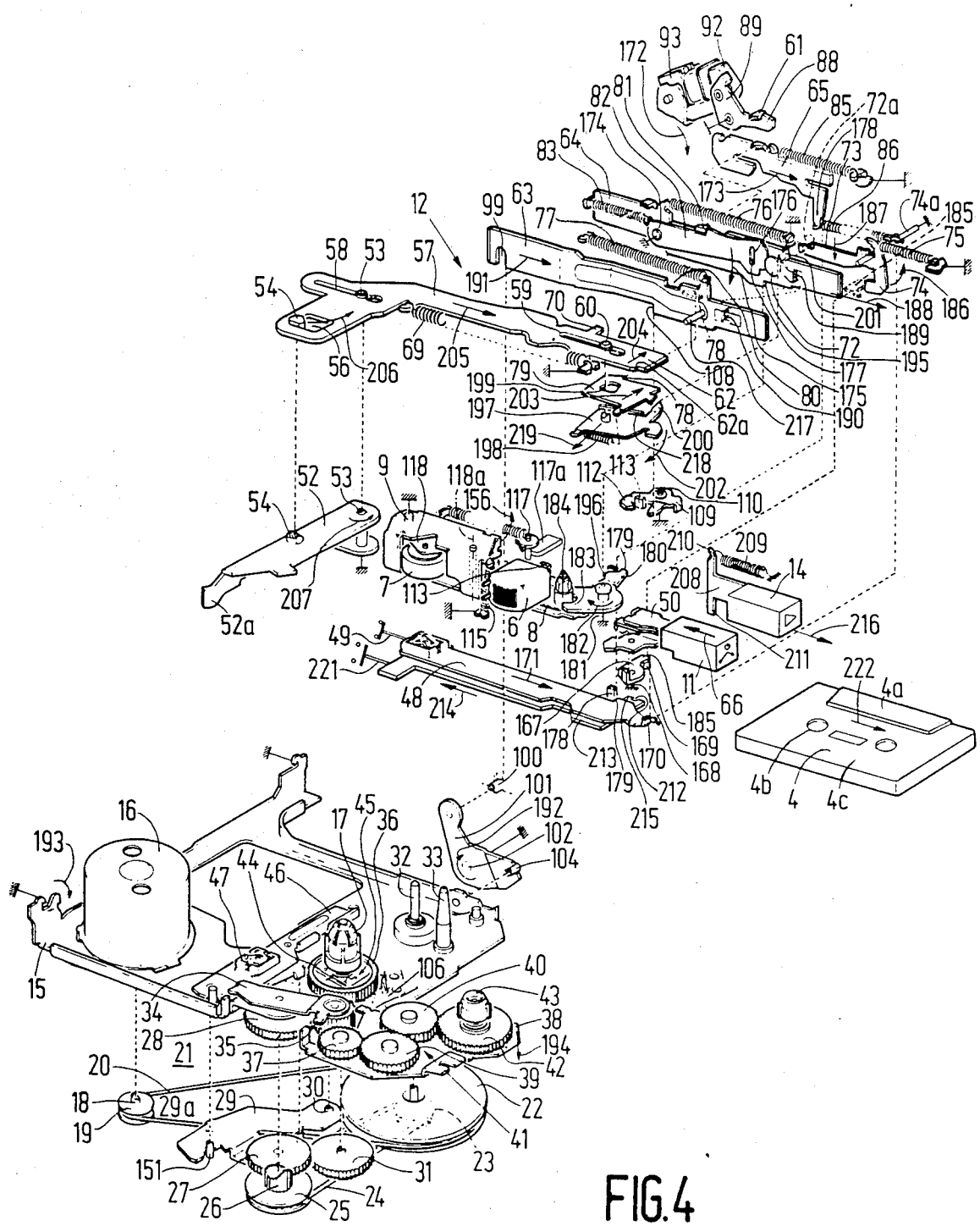
FIG. 4 is a perspective view of the parts of the apparatus of FIG. 1 in the pause-eject mode.

The pause-search mode may also be terminated mechanically. This is effected by briefly pressing the button 14 (FIGS. 1 and 4). As a result of this an electric switch 221 is actuated, which also causes the solenoid 137 to be de-energized. Subsequently, the apparatus is switched to the normal play mode.

C. Fast-wind mode

The fast-wind position of the button 11 is obtained by pivoting the button further in the direction 119 or 157 in FIG. 2. In fact, the situation obtained is the same as described for the pause-search mode (B). However, in this case the pin 125 reaches the end of the slot 126. The larger pivotal movement of the plate 120 causes the pin 154 to have a larger stroke, so that the head bracket 8 is not moved over a small distance of approximately 1 mm as in the case of pause detection, in which position a moderate head-to-tape contact exists, but is moved backwards over a larger distance in the direction of the arrow 156, so that the head is spaced from the tape. In accordance with a further characteristic feature of the invention the edge 155 of the bracket 129, which edge has a stepped profile, determines the three positions of the head bracket 8 in the positions "play", "search" and "fast wind" of the button 11 (see A, B and C, respectively). The other movements during fast winding correspond to the movement already described under B. It is to be noted that returning to the play mode cannot only be effected upon reaching the end of the tape or upon depression of the play button 14, but also by resetting the button 11 to the center position.

D. Pause/eject mode

This position is represented by FIG. 4. The eject position can only be reached through the pause position.

By pressing the button 11 substantially halfway in the direction of the arrow 66 a release bracket 167 is coupled to the lug 50. The bracket 167 is pivotable about a spindle 168 and as a result of the depression of the button 11 it pivots with a finger 169 against a cam 170 of the switching rod 48. The rod 48 is then moved in the direction of the arrow 171 and the switch 49 is changed over. Consequently, the supply voltage to the motor 16 is interrupted, as a result of which the capstan 32 stops and the drive means 21 and the winding mandrel coupled thereto also stop. As a result of the change-over of the switch 49 the play solenoid 93 is no longer energized, the bell-crank lever 89 being pivoted back in the direction of the arrow 172 by the force exerted by the spring 85 through the lug 61. As a result of this movement the play bracket 65 is no longer latched behind the cam 88, so that the pause spring 85 can be released. The pause spring then moves the play bracket 65 back in the direction of the arrow 173.

The movement of the bracket 65 causes the lug 81 to force the auxiliary bracket 82 pivot downwards in the direction of the arrow 175 about a spindle 174 against the force of the spring 83. This movement is limited by a pin 177 which is connected to the bracket 64 and which extends into a slot 176 in the auxiliary bracket 82. As a result of the movement in the direction of the arrow 173 the spring 86, by which the bracket 65 is coupled to the rod 48, is also released. A hook 178 of the bracket 65 is then positioned against a stop 179 on the switching rod 48. During the movement in the direction of the arrow 173 the hook 178 is coupled to a pivotal bracket 180, which is pivotally connected to a spindle 181 on the chassis. Thus, the release of the spring 85 ultimately results in the pivotal bracket 180 being pivoted in the direction of the arrow 182, so that the head bracket 8 pivots back about the spindle 9 in the direction of the arrow 156. To cause this movement a fork-shaped portion 183 of the pivotal bracket 180 pushes against a pin 184 on the head bracket 8. This displacement is approximately 1.5 mm, which substantially corresponds to the situation represented in FIG. 2 during the pause-search mode. The difference from the situation in FIG. 2 is that during the search of pauses on the magnetic tape the motor 16 keeps rotating, whereas it is now stationary. The movement 156 is obtained in opposition to the spring force of the two springs 115 and 166. As a result, these springs are tensioned again. The pin 117 of the pressure-roller lever 118 is again urged against the edge 117a.

At this instant the pause situation is reached. If the button 11 has been depressed completely in the direction of the arrow 66, this results in the release bracket 167 being pivoted further, so that another cam 185 on the bracket 167 causes the main latch constituted by the hook 74 to move in the direction of the arrow 186. As a result, the end of the hook 74 having the sloping edge 73 will make a downward movement in the direction of the arrow 187. Consequently, the bracket 64 is now unlatched because the cam 72 is freed. The bracket 64 then abruptly moves in the direction indicated by the arrow 188 because the spring 76 is released. Since the bracket 64 carries a projection 189 on one side which butts against a finger 190 on one side of the bracket 63 during the movement in the direction 188, the bracket 63 is moved along in a direction indicated by the arrow 191. Because of the presence of the pin 100 in the recess 99 in the bracket 63 the movement 191 is converted into a pivotal movement of the bracket 101 in the direction of the arrow 192, so that the drive plate 15 is swung down in the direction of the arrow 193. As a result, the winding mandrel 146 is withdrawn from the cassette, the capstan 32 and the locating pin 33 being also disengaged from the cassette. During the movement in the direction of the arrow 193 the leaf spring 106 also returns the auxiliary frame 38 and the transmission means 41 arranged on this frame in the direction of the arrow 194, the winding mandrel 43 then being withdrawn from the cassette. During the movement in the direction of the arrow 188 a step 195 on the bracket 64 moves against a further stop 196 on the bracket 180. As the travel of the bracket 64 is much larger than that of the bracket 65, the movement of the bracket 64 results in a larger displacement of the head bracket 8 in the direction of the arrow 156 than the displacement of the bracket 65 upon depression of the button 11 in order to obtain the pause mode. Thus, the head bracket 8 is moved into the fully pivoted position. In this position the magnetic head 6 and the pressure roller 7 are completely withdrawn from the cassette 4.

The pivotal bracket 197, which carries the spindle 60, is arranged underneath the latching bracket 79. The bracket 197 is coupled to the bracket 79 by a tension spring 198. The spindle 60 extends through an opening 199 in the bracket 79. A lug 200 on the bracket 197 is positioned against one side 201 of the bracket 64 at the end of the movement. When the bracket 64 moves in the direction of the arrow 188 the lug 200 is pivoted in the direction of the arrow 202 about a stop, not shown, on the chassis 1. As a result the spring 198 is tensioned and the lug 78 is moved in the direction of the arrow 203. The lug 78 then slides against the edge of the bracket 63 until during the movement in the direction of the arrow 191 the slot 80 meets the lug 78 and the lug engages the recess. As a result the bracket 63 is than latched. The movement of the bracket 197 in the direction of the arrow 203 also moves the spindle 60, situated in the opening 199, in the direction of the arrow 203. This movement is transmitted to the eject bracket 57, which is now moved in the direction indicated by the arrow 204. As a result of that movement, the edge 62a of the end portion 62 of the bracket 57 is freed in the slot 13 and the spring 69 moves, the bracket 57 forward in the guide slot 13 in the direction of the arrow 205. During this movement the finger 54 is positioned against the edge of the opening 56 under the influence of the force exerted by the spring 69 and finger 54 moves along that edge in the direction of the arrow 206. Also during that movement the free end 52a of the eject lever 52 is moved against the cassette 4, so that the cassette is no longer clear of the eject lever. Subsequently, the eject lever is pivoted about the spindle 53 in the direction of the arrow 207, so that the cassette is pushed in the outward direction in accordance with the arrow 222. The advantage of coupling the ejection lever 52 at a later stage is that prior to this all elements of the apparatus which are coupled to the cassette (winding mandrils, capstan, magnetic head) can be withdrawn from the cassette.

To return from the pause mode of the apparatus to the play mode only the play button 14 must be depressed (FIGS. 1 and 4). The end of the button 14 is rigidly connected to a rod 208, a tension spring 209 being arranged between a rod end 210 and the chassis 1. Upon depression of the button 14 the spring 209 is briefly tensioned. A finger 211 on the rod 208 engages a recess 212 in a switching rod 213 which is guided on the chassis 1 directly adjacent the switching rod 48. The switching rod 213 will therefore be moved in the direction of the arrow 214. As a result of this, an edge 215 of the recess 212 in the switching rod 213 butts against the hook 178 of the bracket 65. As a result of this movement the bracket 65 is again moved in the direction of the arrow 84 in FIG. 1 and the spring 86 moves the switching rod 48, so that the rod 48 is again moved in the direction of the arrow 87.

The button 14 can now be released, so that the spring 209 is released and the button 14 with the rod 208 is moved back in the direction indicated by the arrow 216, thereby returning the edge 215 and hence the switching rod 213 to the rest position. The movement of the switching rod 48 and the bracket 65 causes the member 92 to be positioned against the play solenoid 93 and the play solenoid to be re-energized, so that the lug 61 and the cam 88 are latched to each other. After the return movement of the hook 178 the pivotal bracket 180 is freed, so that the head bracket 8 pivots back in the direction of the arrow 164 (see FIG. 3) into the play position under the influence of the force exerted by the spring 166.

As a result of the movement of the switching rod 48 the motor 16 is started again, so that the pressure roller 7 is now positioned against the capstan 32 and the play mode is started. In this way it is ensured that, when the apparatus is switched to the pause mode owing to the release of the play solenoid 93 and of the bell crank lever or pause latch 89, in principle only the pause spring 85 and the coupling spring 86 are released, but the other springs which have been tensioned during insertion of the cassette, specifically the relatively strong springs 69 and 76, remain tensioned. Thus, when the apparatus is again set to the play mode by depression of the button 14 only the two springs 85 and 86 must be tensioned again, which demands only a moderate force. As a result of this arrangement, most of the energy produced by inserting the cassette into the apparatus remains conserved in the apparatus when the apparatus is set to the pause mode.

A further advantage of switching to the pause mode by means of the construction described is that the solenoid 93 makes it possible to obtain the pause mode electrically. For this reference is made to the remark under B as regards the detection of the tape end during winding to the winding mandrel 17. This precludes undesired pressure on the pressure roller and consequent damage to the pressure roller if the user has not noted that the end of the tape is reached. A similar situation may occur if the apparatus is switched off without the button 11 being deliberately depressed and the cassette being ejected. When the apparatus is switched off the solenoid 93 is de-energized and the pressure roller 7 is disengaged from the capstan 32.

Another possibility is the use of the pause mode if the magnetic-tape cassette apparatus is used in conjunction with a car radio. This yields the advantage that, if the supply voltage is turned off, which may happen if the driver turns off the car ignition, the tape deck is switched to the pause mode so that the pressure roller is disengaged from the capstan.

Another possibility in the case of use in a car is that, if so-called traffic information is reproduced by the car radio, the signal used for this purpose electronically supplies a control signal to the magnetic-tape cassette apparatus. Suitably, if the apparatus is in the play mode, the control signal only stops the motor 16 electronically, so that upon termination of the traffic information broadcast the motor is re-started immediately without the pressure roller and the head 6 being withdrawn from the tape, because in this situation the solenoid remains energized. If the apparatus is in the pause-search mode or fast-wind mode respectively the solenoid 93 remains energized during a traffic-information broadcast. The solenoid 137 (FIG. 2) is de-energized, so that the situation is the same as upon reaching the end of the tape in the rewind mode. As soon as the traffic information message has ended the motor 16 is started with the normal speed and the apparatus is in the play mode.

It is to be noted that the apparatus in accordance with the invention makes it possible to accommodate a large number of parts required for the many functions that can be performed in a comparatively small space. Furthermore, the buttons 11 and 14 are constructed so that only a small stroke and a small force are required, while the control button 11 combines a plurality of functions.

What is claimed is:

1. A cassette recorder comprising:
   a chassis,
   a head bracket mounted on the chassis for movement, and a pressure roller and a magnetic head mounted on the bracket,
   an ejection spring,
   a cassette compartment for receiving a magnetic cassette, said compartment including a pivotably mounted ejection lever which upon insertion of a cassette is pivoted in an insertion direction to tension the ejection spring,
   a capstan arranged for driving a magnetic tape in a cassette placed in the compartment, and drive means for the capstan and for transporting the tape past the magnetic head,
   switching means for moving the head bracket toward the cassette,
   latching means for keeping the ejection spring in the tensioned condition, and
   means for actuating said latching means to release the ejection spring so as to pivot the lever in an ejection direction,
   characterized in that said switching means comprises:
   a play bracket movable to and from a play position,
   a pause spring connected to said movable play bracket,
   means for moving said play bracket toward the play position and tensioning the pause spring upon movement of said lever in the insertion direction,
   a pause latch for latching the play bracket in the play position when the pause spring is tensioned,
   means for releasing the pause latch independently of said latching means, and
   means for coupling the play bracket to the head bracket for moving the head bracket away from but not out of the cassette in response to release of the pause latch while said latching means keeps the ejection spring in the tensioned condition.

2. A recorder as claimed in claim 1, characterized in that the pause latch is formed by a pause latch lever, and in that the recorder comprises a spring arranged to urge the pause latch lever toward a latching position during tensioning of the pause spring.

3. A recorder as claimed in claim 2, characterized in that the play bracket comprises a lug arranged to prevent movement of said pause latch lever while the pause spring is being tensioned, and to latch behind a portion of said pause latch lever upon movement of said pause latch lever to said latching position.

4. A recorder as claimed in claim 1, characterized in that the means for actuating said latching means comprises an actuating button; and said means for releasing the pause latch comprises a switching rod, and means for coupling the switching rod to the actuating button for actuating the pause latch.

5. A recorder as claimed in claim 4, characterized in that the pause latch is formed by a pause latch lever, and in that the recorder comprises a spring arranged to urge the pause latch lever toward a latching position during tensioning of the pause spring.

6. A recorder as claimed in claim 5, characterized in that the play bracket comprises a lug arranged to prevent movement of said pause latch lever while the pause spring is being tensioned, and to latch behind a portion of said pause latch lever upon movement of said pause latch lever to said latching position.

7. A recorder as claimed in claim 6, characterized by comprising a coupling spring connecting the play bracket to the switching rod, arranged to move the switching rod as a result of movement of the play bracket when the pause spring is tensioned.

8. A recorder as claimed in claim 7, characterized in that said means for releasing the pause latch comprises an electrically operated device and a switch, said switch controlling said electrically operated device and actuating said drive means.

9. A recorder as claimed in claim 8, characterized in that said coupling spring is arranged such that the coupling spring is tensioned when the play bracket is latched, and the coupling spring is further tensioned when the actuating button is coupled to the switching rod and, after actuation of the pause latch, causes the play bracket to be moved together with the pause spring.

10. A recorder as claimed in claim 9, characterized by comprising a play button and means for coupling the play button via the play bracket to the switching rod for tensioning the pause spring and coupling spring and for moving and subsequently re-latching the play bracket.

11. A recorder as claimed in claim 10, characterized in that said switching means comprises a switching bracket, and a hook having first and second stop portions, pivotally connected to the head bracket about a pivotal axis, said first stop portion being disposed at a greater distance from said pivotal axis and said second stop portion; and in that said play bracket comprises a lug arranged to engage said first portion, and in that said second stop portion is arranged to cooperate with said switching bracket upon actuation of said latching means and release of the ejection spring.

12. A recorder as claimed in claim 11, characterized in that said latching means includes a main latch, and in that said actuating button is arranged to be moveable from a rest position to a pause position by displacement in a first direction, in said pause position said pause latch being actuated, and said actuating button is movable to an eject position by further displacement in said first direction, the recorder further comprising means for coupling said actuating button to said main latch for unlatching the switching bracket responsive to said actuating button being moved to the eject position, and means for subsequently moving the head bracket away from the cassette responsive to movement of said switching bracket, via said second stop portion.

13. A recorder as claimed in claim 5, characterized by comprising a coupling spring connecting the play bracket to the switching rod, arranged to move the switching rod as a result of movement of the play bracket when the pause spring is tensioned.

14. A recorder as claimed in claim 13, characterized in that said coupling spring is arranged such that the coupling spring is tensioned when the play bracket is latched, and the coupling spring is further tensioned when the actuating button is coupled to the switching rod and, after actuation of the pause latch, causes the play bracket to be moved together with the pause spring.

15. A recorder as claimed in claim 14, characterized in that said means for releasing the pause latch comprises an electrically operated device and a switch, said switch controlling said electrically operated device and actuating said drive means.

16. A recorder as claimed in claim 14, characterized by comprising a play button and means for coupling the play button via the play bracket to the switching rod for tensioning the pause spring and coupling spring and for moving and subsequently re-latching the play bracket.

17. A recorder as claimed in claim 13, characterized by comprising a play button and means for coupling the play button via the play bracket to the switching rod for tensioning the pause spring and coupling spring and for moving and subsequently re-latching the play bracket.

18. A recorder as claimed in any one of claims 5-17, characterized in that said actuating button is movable from a rest position to a pause position and subsequently to an eject position in a first direction, and is also movable in a second direction and a third direction opposite to said second direction; in said second and third directions said button being movable from the rest position to a search position and subsequently to a fast-wind position;

the switching means is arranged to position the head bracket in any one of three positions relative to the cassette, and comprises a pivotal bracket having a stepped edge, and a pin connected to the head bracket;

said pin is movable along said stepped edge for positioning in a selected one of three positions corresponding to the three head bracket positions, and when the actuating button is in the search position, the position of the head bracket corresponds to the position of the head bracket when the actuating button is in the pause position.

19. A cassette recorder comprising:
a chassis,
a head bracket mounted on the chassis for movement, and a pressure roller and a magnetic head mounted on the bracket,
an ejection spring,
a cassette compartment for receiving a magnetic cassette, said compartment including a pivotably mounted ejection lever which upon insertion of a cassette is pivoted in an insertion direction to tension the ejection spring,
a capstan arranged for driving a magnetic tape in a cassette placed in the compartment, and drive means for the capstan and for transporting the tape past the magnetic head,
switching means for moving the head bracket toward the cassette,
latching means for keeping the ejection spring in the tensioned condition, and
means for actuating said latching means to release the ejection spring so as to pivot the lever in an ejection direction, characterized in that said switching means comprises:
a play bracket movable to and from a play position,
a pause spring connected to said moveable play bracket,
means for moving said play bracket toward the play position and tensioning the pause spring upon movement of said lever in the insertion direction,
a pause latch for latching the play bracket in the play position when the pause spring is tensioned,
means for releasing the pause latch independently of said latching means, and
means for coupling the play bracket to the head bracket for moving the head bracket away from but not out of the cassette in response to release of the pause latch while said latching means keeps the ejection spring in the tensioned condition,
and further characterized in that said switching means comprises a switching bracket, and a hook having first and second stop portions, pivotally connected to the head bracket about a pivotal axis, said first stop portion being disposed at a greater distance from said pivotal axis than said second stop portion; in that said play bracket comprises a lug arranged to engage said first portion; and in that said second stop portion is arranged to cooperate with said switching bracket upon actuation of said latching means and release of the ejection spring.

20. A recorder as claimed in claim 19, characterized in that said latching means includes a main latch, and in that said means for actuating said latching means comprises an actuating button arranged to be movable from a rest position to a pause position by displacement in a first direction, in said pause portion said pause latch being actuated, and
said actuating button is movable to an eject position by further displacement in said first direction, the recorder further comprising means for coupling said actuating button to said main latch for unlatching the switching bracket responsive to said actuating button being moved to the eject position, and means for subsequently moving the head bracket away from the cassette responsive to movement of said switching bracket, via said second stop portion.

21. A recorder as claimed in claim 19, characterized in that said means for actuating said latching means comprises an actuating button movable from a rest position to a pause position and subsequently to an eject position in a first direction, and also movable in a second direction and a third direction opposite to said second direction; in said second and third directions said button being movable from the rest position to a search position and subsequently to a fast-wind position; and
the switching means is arranged to position the head bracket in any one of three positions relative to the cassette, and comprises a pivotal bracket having a stepped edge, and a pin connected to the head bracket; said pin being movable along said stepped edge for positioning in a selected one of three positions corresponding to the three head bracket positions, the position of the head bracket in the search position of the actuating button corresponding to the position of the head bracket in the pause portion of the actuating button.

* * * * *